(12) United States Patent
Brand et al.

(10) Patent No.: US 7,999,207 B2
(45) Date of Patent: Aug. 16, 2011

(54) APPARATUS FOR MACHINING PLATE-SHAPED OR CYLINDRICAL WORKPIECES COMPRISING CUTTING TEETH

(75) Inventors: Stefan Brand, Mietingen-Walpertshofen (DE); Peter Bailer, Schemmerhofen-Altheim (DE); Norbert Bailer, Schemmerhofen-Altheim (DE); Siegfried Veil, Ochsenhausen (DE)

(73) Assignee: Vollmer Werke Maschinenfabrik Gmbh, Biberach/Riss (DE)

( * ) Notice: Subject to any disclaimer, the term of this patent is extended or adjusted under 35 U.S.C. 154(b) by 964 days.

(21) Appl. No.: 11/912,508

(22) PCT Filed: Apr. 25, 2006

(86) PCT No.: PCT/EP2006/003835
§ 371 (c)(1),
(2), (4) Date: Oct. 25, 2007

(87) PCT Pub. No.: WO2006/117104
PCT Pub. Date: Nov. 9, 2006

(65) Prior Publication Data
US 2008/0193242 A1    Aug. 14, 2008

(30) Foreign Application Priority Data
Apr. 29, 2005  (DE) .......................... 10 2005 020 035

(51) Int. Cl.
*B23H 7/00* (2006.01)
*C25D 17/00* (2006.01)
(52) U.S. Cl. ..................................... 219/68; 204/224 M
(58) Field of Classification Search ........... 219/68–69.2; 204/217, 218, 222, 224 M, 225
See application file for complete search history.

(56) References Cited

U.S. PATENT DOCUMENTS

| | | | |
|---|---|---|---|
| 4,268,999 A | 5/1981 | Noto et al. | |
| 4,348,838 A | 9/1982 | Tacchella | |
| 4,501,092 A | 2/1985 | Archibald | |
| 4,562,392 A | 12/1985 | Davis et al. | |
| 4,641,007 A * | 2/1987 | Lach | 219/69.17 |
| 5,326,954 A | 7/1994 | Lenard et al. | |
| 7,837,533 B2 | 11/2010 | Brand et al. | |

FOREIGN PATENT DOCUMENTS

| DE | 33 28 062 A1 | 2/1985 |
|---|---|---|
| DE | G 87 13 384.9 | 10/1987 |

(Continued)

*Primary Examiner* — Sang Y Paik
(74) *Attorney, Agent, or Firm* — Woodard Emhardt Moriarty McNett & Henry LLP

(57) ABSTRACT

The invention concerns a device (10) for machining slab-shaped or cylindrical workpieces (70) which are provided with cutting teeth (S), with a machine base (12), a machining device (14) which can be displaced relative to the machine base (12), and a workpiece positioning device (16) which can be displaced relative to the machine base (12), the machining device (14) including a machining bridge (18) which can be displaced relative to the machine base (12) linearly along a first spatial axis (Y1) and a machining arm (20) which can be displaced relative to the machining bridge (18) linearly along a second spatial axis (X1), a machining unit (26) with a machining tool (28) being carried on the machining arm (20) so that it can swivel around a swivelling axis (E1), the swivelling axis (E1) substantially running orthogonally to a plane which is spanned by the first and second spatial axes (Y1, X1), the workpiece positioning device (16) also having a bearing slide (32) which can be displaced relative to the machine base (12) linearly along a third spatial axis (Z1), and a tilting bearing arrangement, in which a workpiece holding arrangement (44) is carried so that it can be tilted around a tilting axis (B1), being provided on the bearing slide (32).

10 Claims, 4 Drawing Sheets

FOREIGN PATENT DOCUMENTS

Figure 1:
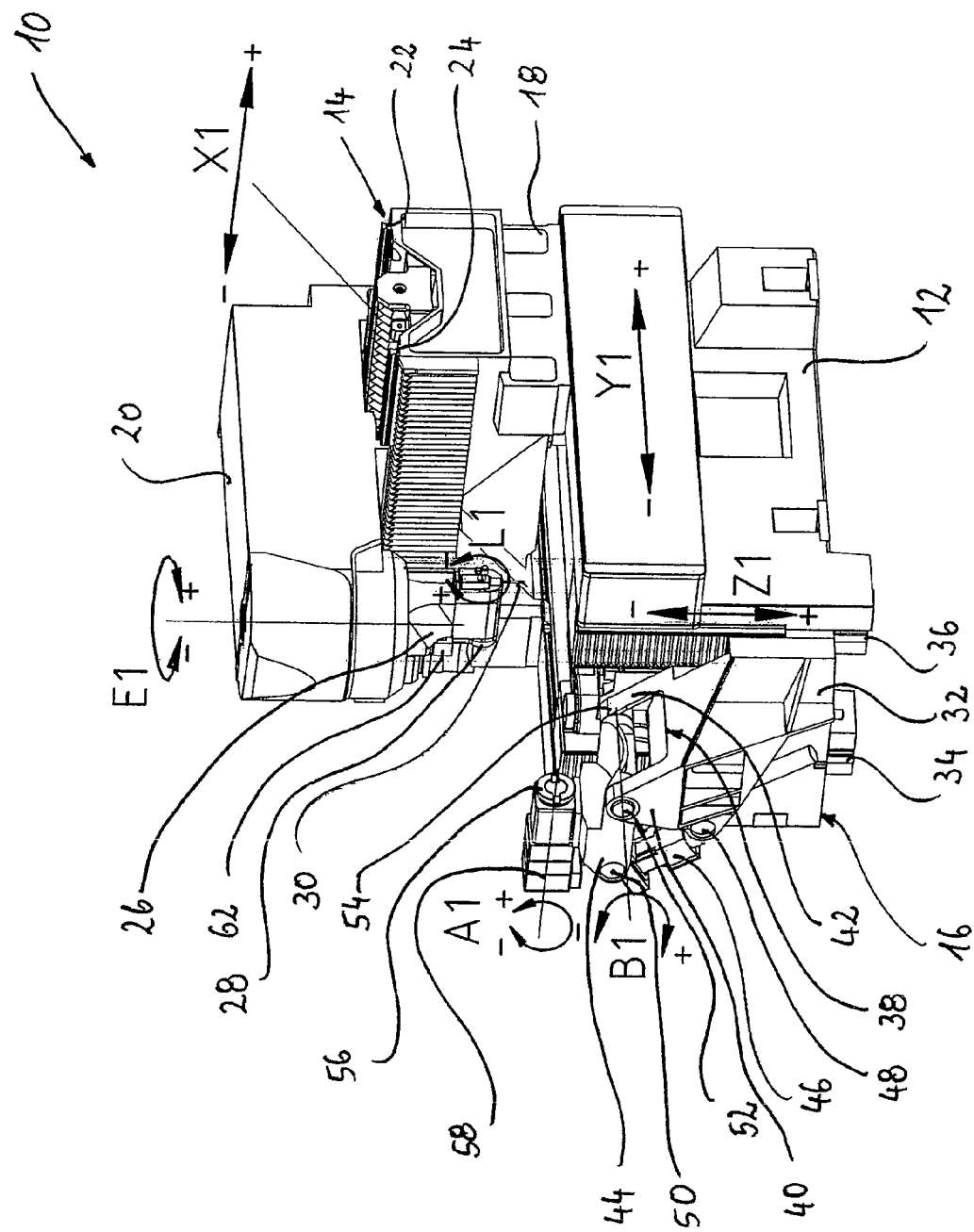

| | | |
|---|---|---|
| DE | 196 26 204 | 1/1997 |
| DE | 698 14 093 T2 | 1/2004 |
| EP | 0 941 790 A1 | 9/1999 |
| EP | 1 052 056 A2 | 5/2000 |
| WO | WO 92/19410 | 11/1992 |
| WO | WO 03/074226 | 9/2003 |

* cited by examiner

APPARATUS FOR MACHINING PLATE-SHAPED OR CYLINDRICAL WORKPIECES COMPRISING CUTTING TEETH

REFERENCE TO RELATED APPLICATIONS

The present application is a national stage of International Patent Application PCT/EP2006/003835, filed 25 Apr. 2006, which claims the benefit of German Patent Application Serial No. 10 2005 020 035.4, filed 29 Apr. 2005, all of which are hereby incorporated by reference.

This invention concerns a device for machining slab-shaped or cylindrical workpieces which are provided with cutting teeth.

Such devices are known from the prior art. Thus, for instance, WO 92/19410 describes a corresponding device. In the case of this device, a machining device with a wire electrode, which can be used for electric discharge machining of workpieces, is provided. The workpieces can be fitted on a workpiece positioning device, which makes it possible to position the workpiece by displacement and rotation around various axes. In detail, the machining device can be displaced linearly along two spatial axes, and swivelled around a swivelling axis which is parallel to one of the spatial axes. The arrangement of the axes of the workpiece positioning device also includes two linear spatial axes and the possibility of swivelling the workpiece around all three spatial axes. For this purpose, the workpiece positioning device has a relatively large, complicated arrangement of axes, which finally provides access to the workpiece only at a particular angular position of the workpiece relative to the workpiece positioning device, namely at the so-called twelve o'clock position, i.e. at the highest radially outer region of the workpiece in the vertical direction. Consequently, considerable limits are set to machining the cutting teeth of the workpiece. Thus certain machining tasks can only be carried out with large travels and swivelling movements. Machining tasks which require bonding of the workpiece in the three o'clock or nine o'clock position, i.e. on cutting teeth which are displaced by about 90° to the highest radially outer region of the workpiece in the vertical direction, cannot be carried out.

From the document DE 196 26 204 A1, a tool grinding machine where the workpiece is fitted on a place on the machine other than the grinding place is known. The machine is provided with two holding units, which can be shifted between the loading place and the grinding place. As well as the holding units, which can be swivelled, the machine includes a machining head, which can be displaced linearly along the spatial axes and rotated around the vertical spatial axis. With this grinding machine too, machining tasks can be carried out on the workpieces only to a limited extent.

Finally, the document EP 1 052 056 shows a five axis CNC grinding machine tool. In the case of this grinding machine tool, the machining device can be displaced linearly along the three spatial axes. One machining head can also be swivelled around two mutually parallel horizontal axes, so that a grinding wheel can be brought into multiple different machining positions relative to a workpiece. On the other hand, a positioning device for positioning the workpiece as required is not provided. All adjustment movements which are necessary for machining the workpiece are carried out by the machining device.

It is an object of this invention to provide a device for machining slab-shaped or cylindrical workpieces which are provided with cutting teeth, said device offering, as well as simple construction and minimum travels, high flexibility in carrying out different machining tasks.

This object is achieved by a device for machining slab-shaped or cylindrical workpieces which are provided with cutting teeth, with a block-like machine base, a machining device which can be displaced relative to the machine base, and a workpiece positioning device which can be displaced relative to the machine base, the machining device including a machining bridge which can be displaced relative to the machine base linearly along a first spatial axis and a machining arm which can be displaced relative to the machining bridge linearly along a second spatial axis, a machining unit with a machining tool being carried on the machining arm so that it can swivel around a swivelling axis, the swivelling axis substantially running orthogonally to a plane which is spanned by the first and second spatial axes, the workpiece positioning device also having a bearing slide which can be displaced relative to the machine base linearly along a third spatial axis, and a tilting bearing arrangement, in which a workpiece holding arrangement is carried so that it can be tilted around a tilting axis, being provided on the bearing slide.

In the case of the device according to the invention, the individual machining axes along or around which movements to machine a workpiece are required are divided in a specially favourable manner between the machining device and the workpiece positioning device, so that the device according to the invention offers, in relatively compact form, good accessibility for the machining device to the workpiece. Because of the division according to the invention of the individual linear displacement axes and swivelling axes into machining device and workpiece positioning device, for the individual machining tasks travels and swivelling movements are required only to a small extent, so that projecting guiding and driving components are avoided and yet all required machining tasks can be carried out. In this way, good accessibility to the workpiece can be achieved, with the result, in particular, that the workpiece can not only be in one machining position, e.g. the twelve o'clock position, i.e. at the vertically highest region of the workpiece, but in a greater angular range. With the invention, it is immediately possible, on a disc-shaped workpiece, to carry out machining tasks in an angular range of 180° around the twelve o'clock position, i.e. between the three o'clock position and the nine o'clock position. Because of the arrangement of axes, complicated machining processes can also be carried out in an automated manner, e.g. erosive machining of oblique surfaces, which for machining require the workpiece to be continuously tilted.

In one implementation variant of the invention, it is provided that the tilting axis runs substantially orthogonally to the third spatial axis. The workpiece can thus be tilted in a way which is advantageous for machining. Corresponding tilting of the machining unit is therefore unnecessary, which simplifies the construction of the whole machine. Preferably, a tilting angle of ±30° relative to a zero position of the workpiece (in which its longitudinal axis runs substantially horizontally) is provided.

For corresponding positioning of the workpiece, it can also be provided that the workpiece holding arrangement has a workpiece holding spindle which can be driven around a workpiece axis of rotation. With the workpiece holding spindle which can be driven in rotation, the workpiece can be rotated around its workpiece axis of rotation, and thus bring the individual cutting teeth to be machined into a desired angular position relative to the workpiece positioning device. It can be provided that the workpiece axis of rotation runs substantially orthogonally relative to the tilting axis.

A further development of the invention provides that the bearing slide is formed with a bearing fork, and that the workpiece holding arrangement is carried in the bearing fork. This form of the workpiece positioning device has the advantage of great dimensional precision. In contrast, self-supporting arrangements such as are known from the prior art according to WO 92/19410 (discussed above), are often subject to the problem of deformation, e.g. caused by the workpiece mass or similar, which can finally also affect the machining result.

A further development of the invention provides that the device is implemented with a linear actuator, particularly an electromechanical actuator, which to tilt the workpiece holding device is arranged between it and the bearing slide. The linear actuator is carried on both the bearing slide and the workpiece holding device so that it can swivel, and ensures the above-mentioned tilting movement. The workpiece holding arrangement can be tilted depending on the stroke of the linear actuator.

According to the invention, it can also be provided that the machining tool is fitted on the machining unit so that it can be driven around a driving axis. In this case, it is possible that the driving axis runs substantially orthogonally to the swivelling axis. Preferably, it is provided that the machining tool is an eroding electrode. However, the machining tool can equally well be a grinding wheel, a wire electrode or a laser tool.

In a further development of the invention, it is provided that the machining tool projects from one side of the machining unit, and that on the opposite side of the machining unit relative to the swivelling axis, a probe is provided. Thus the machining unit, according to how it is used, can be swivelled into a position in which the tool comes into contact with the workpiece to be machined, or in which the probe comes into contact with the workpiece to be machined, to measure it. Fitting the machining tool and the probe on opposite sides of the machining unit has the advantage that they do not interfere with each other when they are used, and thus more possibilities for using the machine according to the invention are opened up compared with the prior art.

A further development of the invention provides a coolant system, which can be put into a fixed spatial arrangement relative to the machining tool and machine base. This feature is particularly relevant to the use of the device according to the invention with an erosion tool, e.g. a relatively slowly rotating eroding wheel. To obtain sufficiently good machining results, a laminar flow of coolant onto the eroding wheel in the region of the contact point to the workpiece is necessary. In this way, it is possible to ensure that no air bubbles, which can result in a lower machining quality, occur at the erosion point. The applicant has recognised that because of the fixed spatial arrangement of the coolant system relative to the machining tool and machine base, a permanently reproducible laminar flow of coolant onto the machining tool can be achieved. This is a substantial advantage compared with the prior art as it is shown in, for instance, EP 1 052 056 A2. There the individual coolant outlets can be swivelled with the machining tools. However, in the case of a low pressure flow onto the machining tools, such as is usually chosen in the case of erosion machining with a relatively slowly rotating eroding wheel, because of gravity the course of the flow of the coolant would change, so that according to the swivelling position, different flow states would be achieved in the region of the contact point. Thus the occurrence of air bubbles can no longer be reliably prevented. In the case of this prior art, this problem can be avoided by conveying coolant at high pressure onto the machining point. This is entirely possible in the case of grinding machining of the workpiece, and also usual because of the high rotational speed of the grinding wheel. However, as noted above, high pressure flow is unsuitable for the case of erosive machining.

The invention therefore ensures, because of the fact that tilting does not take place in the region of the machining unit but in the region of the workpiece positioning device, that in the region of the contact point between machining tool and workpiece reproducible flow conditions with coolant can be obtained.

The invention also concerns a method of machining slab-shaped or cylindrical workpieces which are provided with cutting teeth, with a device, particularly of the type described above, the device including a machine base, a machining device which can be displaced relative to the machine base, and a workpiece positioning device which can be displaced relative to the machine base, the machining device including a machining tool which is substantially disc-shaped, and which is brought into machining-effective contact with a radially outer tool region to a cutting tooth which is arranged in a radially outer workpiece region, the workpiece being tilted relative to the tool, during the machining of the cutting tooth, by means of the workpiece positioning device, in such a way that the contact point in the radially outer tool region remains substantially at the same angular position of the machining tool relative to the machining device, and that the contact point in the radially outer workpiece region remains substantially at the same angular position of the workpiece relative to the workpiece positioning device.

The invention is explained below on the basis of the attached Figures.

Figure 5:
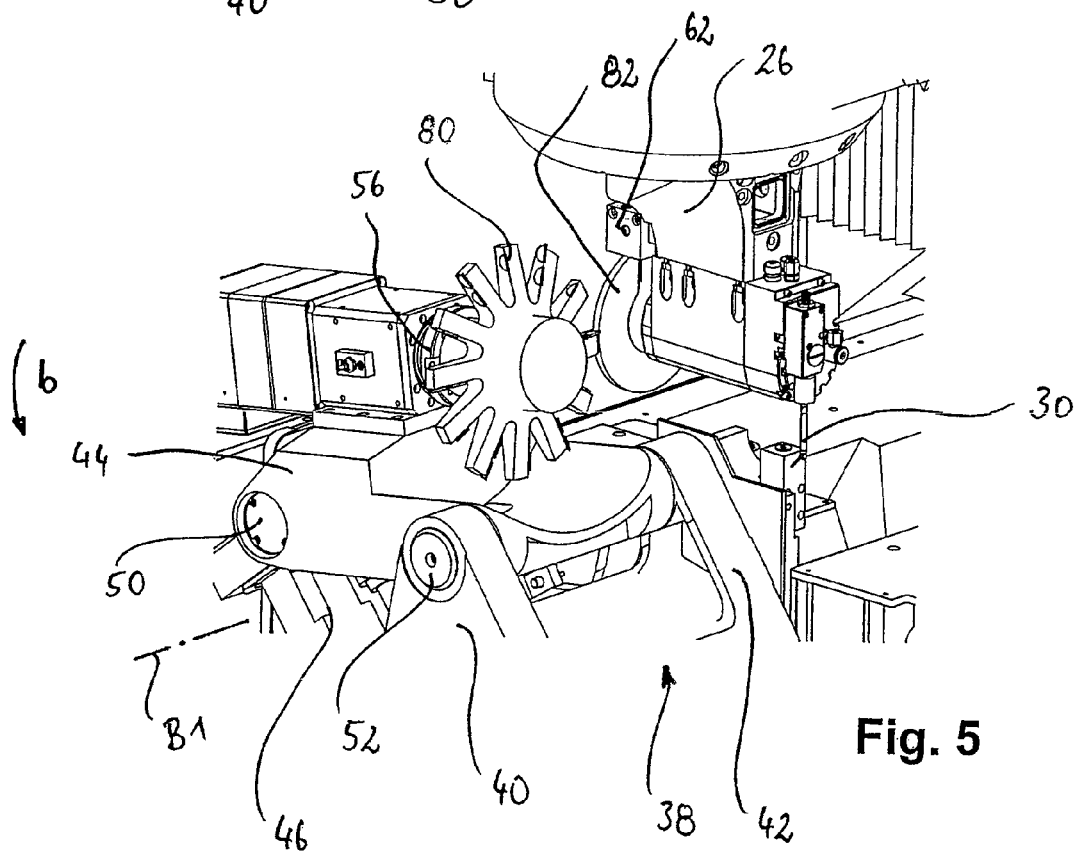
Figure 6:
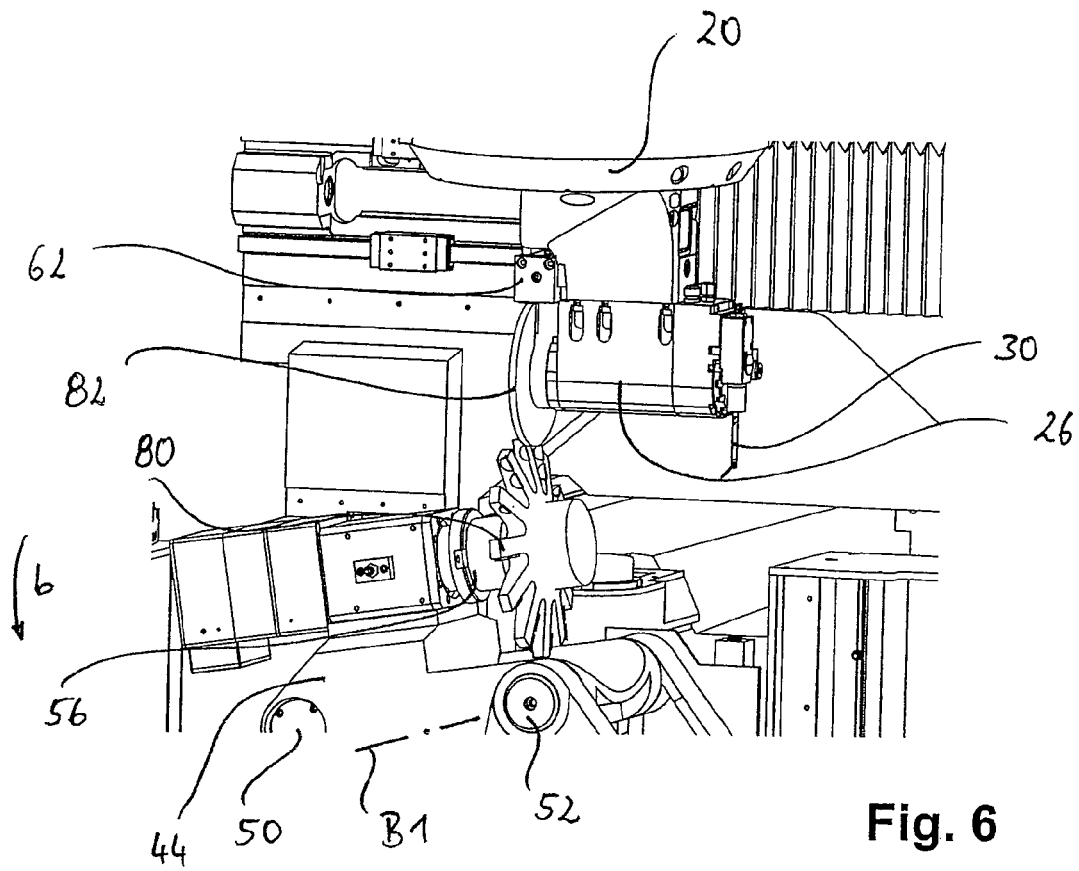
Figure 7:
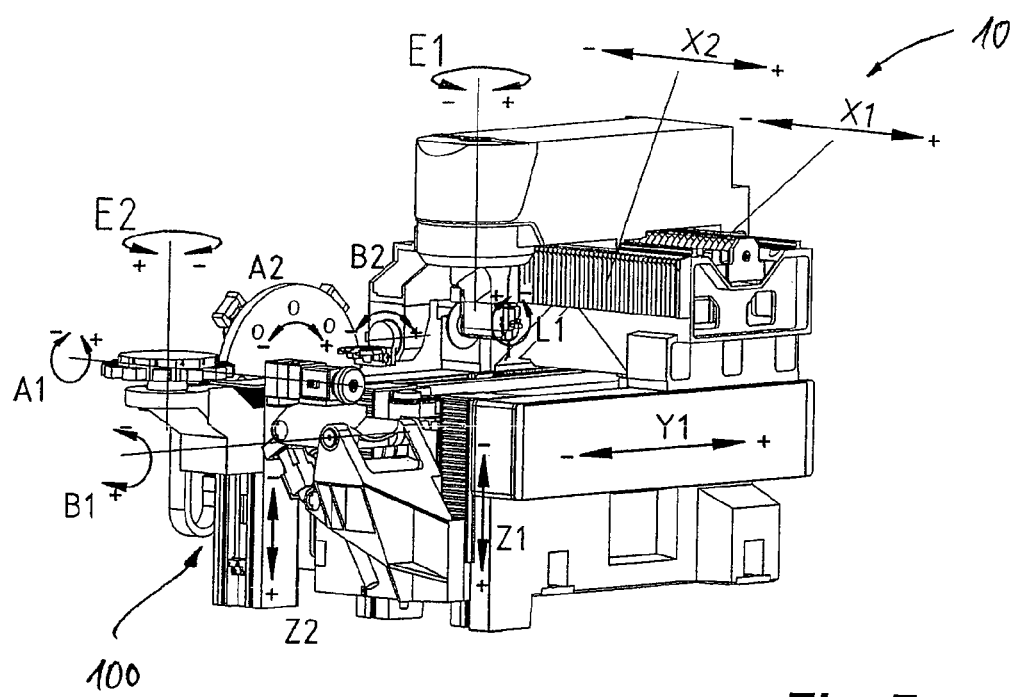

FIG. 1 shows a perspective overview representation of the device according to the invention FIGS. 2 to 6 show various machining situations and measurement situations in relation to the device according to the invention and FIG. 7 shows a slightly modified embodiment of the device according to the invention.

In FIG. 1, an overview representation of the device according to the invention is shown, and generally designated with 10. It includes a block-like machine base 12, which is permanently carried on a foundation. On the machine base 12, a machining device 14 and a workpiece positioning device 16 are fitted. The machining device 14 includes a machining bridge 18, which can be displaced relative to the machine base 12, guided by a controlled tool axis along the spatial axis Y1. For this purpose, on the machine base 12 corresponding linear guides and a driving device are provided, and make possible an exact linear displacement of the machining arm 20 along the spatial axis Y1. On the machining bridge 18, a machining arm 20 is fitted. The machining arm 20 can be displaced under control on the machining bridge 18 along a spatial axis X1 which is orthogonal to the axis Y1. For this purpose, linear guides 22 and 24 are provided, and make possible an exact linear displacement of the machining arm 20 along the spatial axis X1.

The machining arm 20 projects from the machining bridge 18 in a self-supporting manner, to the left in FIG. 1. At its free end, a machining unit in the form of a swivelling head 26 is fitted on the machining arm 20. The swivelling head 26 can be swivelled around a swivelling axis E1. The swivelling axis E1 is substantially orthogonal to a virtual plane which is spanned by the two axes X1 and Y1. The swivelling head 26 can be swivelled around the swivelling axis E1 into arbitrary angular positions over a range of up to 360°. On the swivelling head E1, an eroding wheel 28 and a probe 30 are fitted. The eroding wheel 28 can be driven around a driving axis L1 via a rotating drive which is integrated in the swivelling head 26. The eroding wheel 28 is fitted on one side of the swivelling head 26 relative to the swivelling axis E1, whereas the probe 30 is fitted on the opposite side of the swivelling head 26 relative to the swivelling axis E1.

As FIG. 1 also shows, the workpiece positioning device is arranged on the machine base on a vertical side surface. It includes a bearing slide 32. The bearing slide 32 can be displaced linearly along a third spatial axis Z1 by appropriate driving. For this purpose, linear guides 34 and 36 are in turn fitted on the machine base 12, and make it possible to displace the bearing slide 32 exactly along the vertical spatial axis Z1 via a corresponding driving device.

The bearing slide 32 has at its top end a bearing fork 38 with a first bearing strut 40 and a second bearing strut 42. Between the bearing struts 40 and 42, a free space is provided, and a workpiece holding arrangement 44 is arranged in it. The workpiece holding arrangement 44 can be tilted by about ±30+ around a tilting axis B1. The tilting axis B1 runs substantially orthogonally to the third spatial axis Z1. To implement an automated tilting movement, a drivable linear actuator 46 is provided, and is carried so that it can swivel with one of its ends in a swivelling bearing 48 on the bearing slide 32 and its other end on a swivelling bearing 50 on the workpiece holding arrangement 44. It should be added that the bearing arrangement of the workpiece holding arrangement 44 within the bearing fork 38 is implemented via a movable bearing 52 and a fixed bearing 54.

On the workpiece holding arrangement 44, a workpiece holding spindle 56, which can be driven in rotation, is provided. A rotating drive 58, which is fitted for this purpose, makes it possible to rotate a disc-shaped workpiece which is to be machined, e.g. a circular saw blade 70 which is to be sharpened by erosion machining (see FIG. 2), around a workpiece axis of rotation A1. The workpiece axis of rotation A1 runs substantially orthogonally to the tilting axis B1.

FIG. 1 also shows a coolant system 62, which is arranged on the swivelling head 26 in a fixed spatial correspondence to the eroding wheel 28. This means that a substantially constantly flowing stream of coolant can always flow onto the eroding wheel, irrespective of the effects of gravity, in every position of the swivelling head, via the coolant system 62. The movements of the swivelling head, by displacement along the spatial axes Y1 and X1 and by swivelling around the swivelling axis E1, ensure that coolant flows onto the eroding wheel 28 reproducibly and independently of gravity, so that in the region of the eroding wheel, a laminar flow of coolant can be achieved.

The device according to the invention makes it possible to carry out various measurement and machining tasks, which will be discussed below on the basis of FIGS. 2 to 6, always referring to the overview representation according to FIG. 1.

Figure 2:
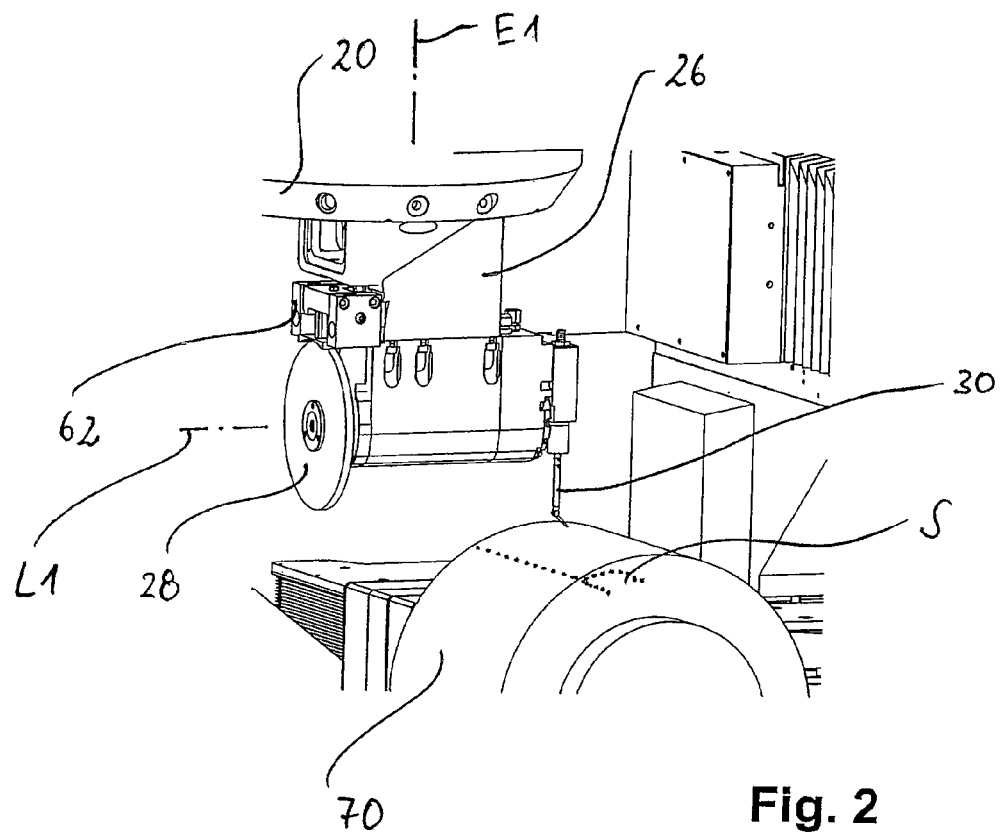
Figure 3:
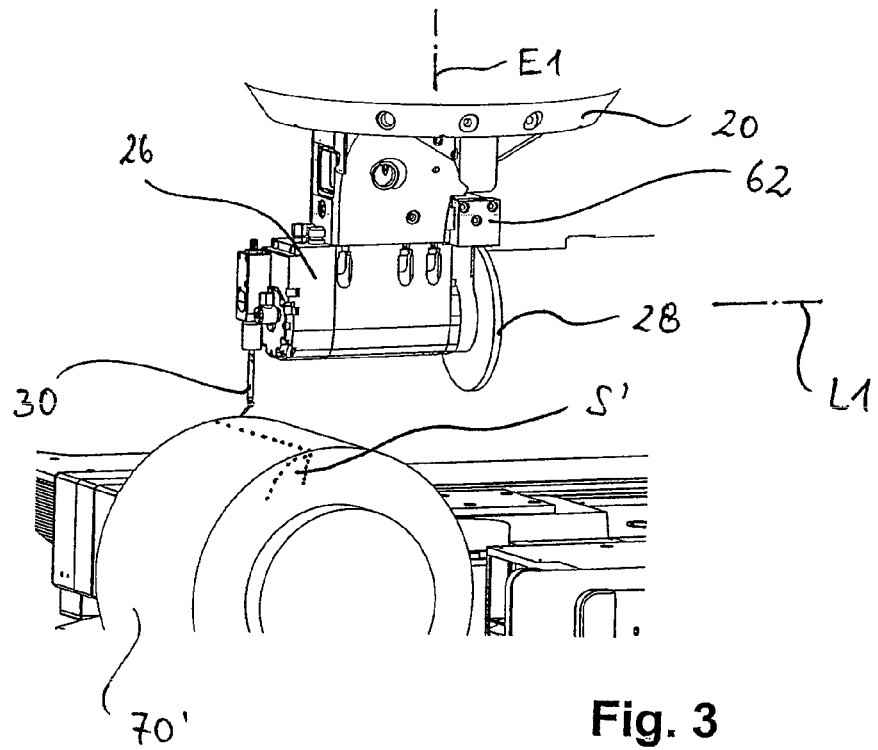

FIGS. 2 and 3 each show a case of using the device 10 according to the invention for measuring a cylindrical workpiece, e.g. an end milling cutter 70 (see FIG. 2) or 70' (see FIG. 3). The difference between the end milling cutters 70 and 70' is that the end milling cutter 70 is right-cutting, i.e. it is implemented with cutting teeth S according to FIG. 2. In contrast, the end milling cutter 70' which is shown schematically in FIG. 3 is left-cutting, i.e. implemented with cutting teeth S' which are aligned in the opposite direction to the cutting teeth S from FIG. 2.

In FIGS. 2 and 3, it can be seen that because of the arrangement according to the invention of the probe 30 and machining tool 28 on opposite sides of the swivelling head 26, the probe 30 can be swivelled into a suitable position for measuring the workpiece 70 or 70'. Therefore, measurement tasks can easily be carried out on the workpiece 70 or 70' with very different orientations of the probe 30.

For instance, FIG. 2 shows a measurement situation, in which the workpiece 70, which is in the form of a right-cutting end milling cutter, in its twelve o'clock position, i.e. in its vertically highest region, is measured by the probe 30. In contrast, in FIG. 3 the workpiece 70', which is in the form of a left-cutting end milling cutter, is measured with the probe 30, and in this case the swivelling head 26 has been swivelled around the axis E1 through an angle of 180°.

Figure 4:
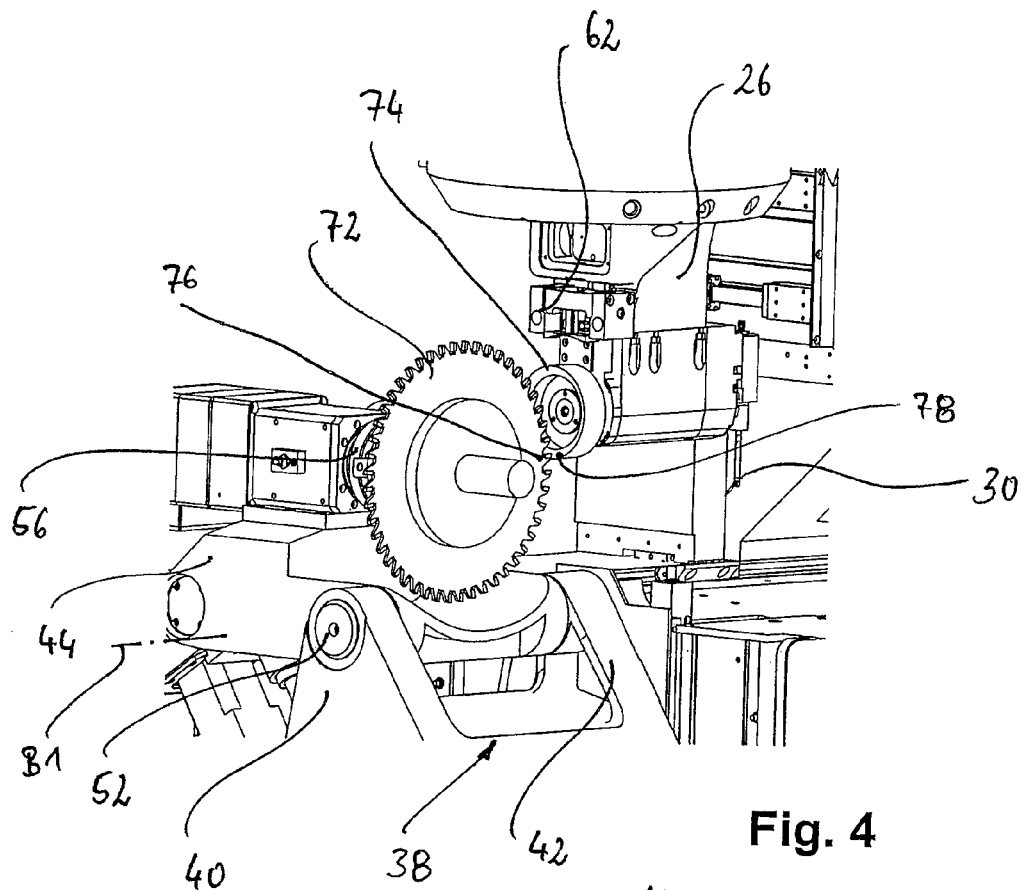

FIG. 4 shows a machining situation in which a circular saw blade 72 is machined with a rotating bowl-shaped eroding wheel 74, which is fitted on the swivelling head 26. The machining takes place in a radially outer angular region 76 of the circular saw blade 72, which—because of its position corresponding to a corresponding position on a dial of a clock—is called the three o'clock position. The face of the eroding wheel 74 comes into contact with the circular saw blade 72 in a radial angular region which—because of its position corresponding to a corresponding position on a dial of a clock—is called the six o'clock position.

Because of the form according to the invention of the deice 10, it is possible to machine the cutting tooth (which is momentarily in the angular region 76) of the circular saw blade 72 by suitable displacement of the swivelling head 26 along the spatial axes X1 and Y1, and by swivelling it around the swivelling axis E1 over its whole outer face and side surface region. In this case the circular saw blade 72 can remain in the position shown in FIG. 4. Similarly, the eroding wheel 74 only ever makes contact with the cutting tooth, which is in the angular region 76 and is to be machined, in the angular region 78 of the eroding wheel 74, resulting in high quality machining results. This is ensured by the distribution according to the invention of the individual machining axes to the machining device 14 on the one hand and the workpiece positioning device 16 on the other hand. Also, the arrangement according to the invention of the probe 30 on the end of the swivelling head 26 facing away from the eroding wheel 74 ensures that the probe 30, in the case of such machining, does not have a mutual interfering effect with another machine component.

It should be noted that in the case of the representation according to FIG. 4, no tilting around the tilting axis B1 takes place.

FIG. 5 shows a machining situation which differs from the machining situation according to FIG. 4. In the case of the machining situation according to FIG. 5, a so-called flattening milling cutter 80 is machined using a disc-shaped eroding wheel 82. The special feature of the flattening milling cutter 80 is its inclined face, which for machining in the position shown in FIG. 5 requires the workpiece holding arrangement 44 to be tilted around the tilting axis B1. This is indicated by the arrow b in FIG. 5. It can also be seen that the flattening milling cutter 80, like the circular saw blade 72 in FIG. 4, is machined in its three o'clock position, but that the periphery of the eroding wheel 82 contacts the flattening milling cutter 80 in the eroding wheel's three o'clock position.

FIG. 6 shows a machining situation in which the flattening milling cutter 80 according to FIG. 5 is machined in its twelve o'clock position. The face of the eroding wheel 82 makes contact with the flattening milling cutter 80 in the region of its six o'clock position. In this machining situation too, the flattening milling cutter 80 is positioned obliquely by swivelling the workpiece holding arrangement 44 around the swivelling axis B1 correspondingly to the arrow b.

It is understood that the representations according to FIGS. 2 and 6 give only an overview of the possibility, with the device 10 according to the invention, of carrying out numerous machining tasks and measurement tasks on workpieces of the most varied geometry and the most varied purpose. The arrangement according to the invention of the machining axes and swivelling axes (or axes of rotation) and the arrangement according to the invention of the eroding wheel and probe on the swivelling head 26 have the advantage that the workpiece to be machined is in every case accessible on both faces and its periphery, over an angular region from its three o'clock position via its twelve o'clock position to its nine o'clock position, and that machining with an eroding wheel can be done in such a way that both the faces and the periphery of the eroding wheel can contact the workpiece to be machined in an angular region from its three o'clock position via its twelve o'clock position to its nine o'clock position. Additionally, the possibility of tilting the workpiece to be machined around the tilting axis B1 should be pointed out, which opens up further machining possibilities, as shown in FIGS. 5 and 6.

Another substantial aspect of the invention is that the coolant system 62 is in a fixed spatial arrangement to the eroding wheel 74 or 82 which is currently in use. In this way, it is possible to ensure a substantially constant coolant flow with respect to flow angle and flow position onto the eroding wheel 74 or 82, so that air bubbles at the eroding point, which absolutely must be avoided for a high quality eroding result, can be reliably prevented. According to the invention, a reproducible laminar coolant flow can always be set up at the eroding point, at relatively low cost. In relation to this, it should be mentioned that tilting the swivelling head, as is known, for instance, from the prior art, causes changes with respect to flow angle and flow position because of gravity, and thus at least makes achieving a reproducible laminar coolant flow difficult.

FIG. 7 now shows the arrangement according to FIG. 1, a workpiece and tool feeding system 100 being additionally provided. This includes a series of further displacement axes and swivelling axes, all with the digit "2". However, the method of functioning of the device 10 according to the invention and the above description does not change.

The invention claimed is:

1. Device (10) for machining slab-shaped or cylindrical workpieces (70) which are provided with cutting teeth (S), with
a machine base (12),
a machining device (14) which is displaceable relative to the machine base (12), and
a workpiece positioning device (16) which is displaceable relative to the
machine base (12), wherein
the machining device (14) including a machining bridge (18) which is displaceable relative to the machine base (12) linearly along a first spatial axis (Y1) and a machining arm (20) which is displaceable relative to the machining bridge (18) linearly along a second spatial axis (X1), a machining unit (26) with a machining tool (28) being carried on the machining arm (20) so that it is swivelable around a swivelling axis (E1), wherein the workpiece positioning device (16) has a bearing slide (32) which is displaceable relative to the machine base (12) linearly along a third spatial axis (Z1), and
wherein a tilting bearing arrangement, in which a workpiece holding arrangement (44) is carried so that it is tiltable around a tilting axis (B1), is provided on the bearing slide (32), wherein the tilting axis (B1) runs substantially orthogonally to the third spatial axis (Z1) characterized in that
the swivelling axis (E1) substantially running orthogonally to a plane which is spanned by the first and second spatial axes (Y1, X1),
and that the machining tool (28) is fitted on the machining unit (26) so that it is drivable around a driving axis (L1), wherein the driving axis (L1) runs substantially orthogonally to the swiveling axis (B1).

2. Device (10) according to claim 1,
characterized in that the workpiece holding arrangement (44) has a workpiece holding spindle (56) which is drivable around a workpiece axis of rotation (A1).

3. Device (10) according to claim 2,
characterized in that the workpiece axis of rotation (A1) runs substantially orthogonally relative to the tilting axis (B1).

4. Device (10) according to claim 1,
characterized in that the machining tool is an eroding electrode (28).

5. Device (10) according to claim 1,
characterized in that the machining tool is a grinding wheel.

6. Device (10) according to claim 1,
characterized in that the machining tool (28) projects from one side of the machining unit (26), and that on the opposite side of the machining unit (26) relative to the swivelling axis (E1), a probe (30) is provided.

7. Device (10) according to claim 1,
characterized by a coolant system (62), which is placeable into a fixed spatial arrangement relative to the machining tool (72, 80) and machine base (12).

8. Method of machining slab-shaped or cylindrical workpieces (56) which are provided with cutting teeth (S), with a device (10) according to claim 1 wherein
the machining device (14) including a machining tool (74, 82) which is substantially disc-shaped, and which is brought into machining-effective contact with a radially outer tool region to a cutting tooth (S) which is arranged in a radially outer workpiece region,
the workpiece (72, 80) being tilted relative to the tool (74, 82), during the machining of the cutting tooth (S), by means of the workpiece positioning device (16), in such a way that the contact point in the radially outer tool region remains substantially at the same angular position of the machining tool (74, 82) relative to the machining device (14), and that the contact point in the radially outer workpiece region remains substantially at the same angular position of the workpiece (72, 80) relative to the workpiece positioning device (16).

9. Device (10) for machining slab-shaped or cylindrical workpieces (70) which are provided with cutting teeth (S), with
a machine base (12),
a machining device (14) displaceable relative to the machine base (12), and
a workpiece positioning device (16) movable relative to the machine base (12),
the machining device (14) including a machining bridge (18) displaceable relative to the machine base (12) linearly along a first spatial axis (Y1) and a machining arm (20) displaceable relative to the machining bridge (18) linearly along a second spatial axis (X1), a machining unit (26) with a machining tool (28) being carried on the machining arm (20) so that it is swivelable around a swivelling axis (E1), the swivelling axis (E1) substantially running orthogonally to a plane which is spanned by the first and second spatial axes (Y1, X1), characterized in that the workpiece positioning device (16) has a bearing slide (32) displaceable relative to the machine base (12) linearly along a third spatial axis (Z1), and that a tilting bearing arrangement, in which a workpiece holding arrangement (44) is carried so that it is tiltable around a tilting axis (B1), is provided on the bearing slide (32);

characterized in that the bearing slide (32) is formed with a bearing fork (38), and that the workpiece holding arrangement (44) is carried in the bearing fork (38).

10. Device (10) for machining slab-shaped or cylindrical workpieces (70) which are provided with cutting teeth (S), with a machine base (12), a machining device (14) displaceable relative to the machine base (12), and a workpiece positioning device (16) movable relative to the machine base (12), the machining device (14) including a machining bridge (18) displaceable relative to the machine base (12) linearly along a first spatial axis (Y1) and a machining arm (20) displaceable relative to the machining bridge (18) linearly along a second spatial axis (X1), a machining unit (26) with a machining tool (28) being carried on the machining arm (20) so that it is swivelable around a swivelling axis (E1), the swivelling axis (E1) substantially running orthogonally to a plane which is spanned by the first and second spatial axes (Y1, X1), characterized in that the workpiece positioning device (16) has a bearing slide (32) displaceable relative to the machine base (12) linearly along a third spatial axis (Z1), and that a tilting bearing arrangement, in which a workpiece holding arrangement (44) is carried so that it is tillable around a tilting axis (B1), is provided on the bearing slide (32);

characterized by a linear actuator (46), particularly an electromechanical actuator, which to tilt the workpiece holding device (44) is arranged between it and the bearing slide (32).

* * * * *